United States Patent
Lee et al.

(10) Patent No.: US 9,805,074 B2
(45) Date of Patent: Oct. 31, 2017

(54) COMPRESSED REPRESENTATION OF A TRANSACTION TOKEN

(71) Applicants: Juchang Lee, Seoul (KR); Chang Gyoo Park, Seoul (KR); Hyoungjun Na, Seoul (KR); Kyuhwan Kim, Anyang (KR)

(72) Inventors: Juchang Lee, Seoul (KR); Chang Gyoo Park, Seoul (KR); Hyoungjun Na, Seoul (KR); Kyuhwan Kim, Anyang (KR)

(73) Assignee: SAP AG, Walldorf (DE)

(*) Notice: Subject to any disclaimer, the term of this patent is extended or adjusted under 35 U.S.C. 154(b) by 230 days.

(21) Appl. No.: 13/760,850

(22) Filed: Feb. 6, 2013

(65) Prior Publication Data

US 2014/0149368 A1    May 29, 2014

Related U.S. Application Data

(60) Provisional application No. 61/730,846, filed on Nov. 28, 2012.

(51) Int. Cl.
  *G06F 7/00* (2006.01)
  *G06F 17/00* (2006.01)
  *G06F 17/30* (2006.01)

(52) U.S. Cl.
  CPC .. *G06F 17/30309* (2013.01); *G06F 17/30286* (2013.01); *G06F 17/30356* (2013.01)

(58) Field of Classification Search
  CPC ......... G06F 17/30356; G06F 17/30309; G06F 17/30286

(Continued)

(56) References Cited

U.S. PATENT DOCUMENTS 5,835,764 A * 11/1998 Platt ............... G06F 9/4881 718/101
7,177,839 B1 * 2/2007 Claxton ............ G06Q 20/12 705/44

(Continued)

OTHER PUBLICATIONS

Chang et al., Bigtable: A Distributed Storage System for Structured Data, Google, Nov. 2006, 14 pages, http://static.googleusercontent.com/media/research.google.com/en//archive/bigtable-osdi06.pdf.*

(Continued)

*Primary Examiner* — Kris Mackes
*Assistant Examiner* — Lin Lin Htay
(74) *Attorney, Agent, or Firm* — Sterne, Kessler, Goldstein & Fox, P.L.L.C.

(57) ABSTRACT

Methods, systems and computer-readable storage mediums encoded with computer programs executed by one or more processors for providing a compressed representation of a transaction token are disclosed. In an embodiment, a transaction token maintains statues of transaction to a database in a first data structure and a second data structure. The first data structure includes a plurality of identifiers respectively corresponding to the transactions to the database and a corresponding status of each identifier indicating whether a given transaction is open or closed, wherein the plurality of identifiers is maintained below a threshold number of identifiers. The second data structure includes a plurality of identifiers of transactions to the database beyond the threshold and whose status is open.

24 Claims, 7 Drawing Sheets

(58) Field of Classification Search
USPC .......................................................... 707/695
See application file for complete search history.

(56) References Cited

U.S. PATENT DOCUMENTS

| | | | | |
|---|---|---|---|---|
| 7,689,565 | B1* | 3/2010 | Gandhi | G06F 17/30575 707/999.01 |
| 8,296,772 | B2* | 10/2012 | Bulfin | G06F 9/505 718/102 |
| 8,423,564 | B1* | 4/2013 | Hayes | 707/758 |
| 2003/0135523 | A1* | 7/2003 | Brodersen | G06F 17/30584 |
| 2006/0089951 | A1* | 4/2006 | Factor | G06F 11/3485 |
| 2008/0228937 | A1* | 9/2008 | Araumi | H04L 67/22 709/232 |
| 2008/0288727 | A1* | 11/2008 | Baum | G06F 9/466 711/149 |
| 2011/0072230 | A1* | 3/2011 | Dudgeon | G06F 3/0608 711/165 |
| 2011/0153566 | A1* | 6/2011 | Larson et al. | 707/638 |
| 2011/0161379 | A1* | 6/2011 | Grund | G06F 17/30312 707/812 |
| 2012/0084135 | A1* | 4/2012 | Nissan | G06Q 30/06 705/14.38 |
| 2012/0124081 | A1* | 5/2012 | Ebrahimi | G06F 17/30569 707/769 |
| 2012/0233139 | A1* | 9/2012 | Larson et al. | 707/703 |
| 2012/0310991 | A1* | 12/2012 | Frantz et al. | 707/799 |
| 2013/0268503 | A1* | 10/2013 | Budithi | G06F 17/30365 707/703 |
| 2013/0346378 | A1* | 12/2013 | Tsirogiannis et al. | 707/693 |

OTHER PUBLICATIONS

Extended European Search Report for European Application No. 13194719.4, dated Jun. 7, 2017; 15 pages.

Hasso Plattner, "SanssouciDB: an In-Memory Database for Processing Enterprise Workloads", Jan. 31, 2011, http://ares.epic.hpi.nni-potsdam.de/apps/static/papers/btw2011_lattest.pdf, 20 pages.

Stevenj: "Divide and conquer algorithm", Nov. 17, 2012, https://en.wikipedia.org/w/index.php?title=Divide_and_conquer_algorithm&oldid=523552104, 2 pages.

* cited by examiner

COMPRESSED REPRESENTATION OF A TRANSACTION TOKEN

CROSS-REFERENCE TO RELATED APPLICATION

This application claims the benefit of U.S. Provisional Application No. 61/730,846, filed Nov. 28, 2012, which is hereby incorporated by reference in its entirety.

FIELD

The present embodiments are generally related to the field of transaction management and multi-version concurrency control (MVCC) for databases.

BACKGROUND

A multi-version concurrency control (MVCC) database often has many transactions simultaneously accessing or seeking to access the data of the database. MVCC databases simultaneously maintain multiple versions of data that are accessed by both read and write transactions. To determine which version of data a particular transaction may access, a transaction token including a status of the transactions is maintained and provided for use with the transaction. These transaction tokens however, especially in situations when there exist long running transactions, may become very large which slows down overall processing of the database system on which they are used.

BRIEF SUMMARY

Some aspects of the subject matter described in this specification may be embodied in a computer-implemented method according to an embodiment. A transaction token maintains statuses of a transaction to a database in a first data structure and a second data structure. The first data structure includes a plurality of identifiers respectively corresponding to the transactions to the database and a corresponding status of each identifier indicating whether a given transaction is open or closed, wherein the plurality of identifiers is maintained below a threshold number of identifiers. The second data structure includes a plurality of identifiers of transactions to the database beyond the threshold and whose status is open.

Other embodiments described herein include corresponding systems, apparatus, and computer programs, configured to perform the actions of the methods, encoded on computer storage devices. Further embodiments, features, and advantages, as well as the structure and operation of the various embodiments are described in detail below with reference to accompanying drawings.

BRIEF DESCRIPTION OF THE DRAWINGS/FIGURES

The accompanying drawings, which are incorporated herein and form a part of the specification, illustrate exemplary embodiments and, together with the description, further serve to explain the principles of the disclosure and to enable a person skilled in the relevant art(s) to make and use the invention, including but not limited to contemplated and disclosed embodiments.

DETAILED DESCRIPTION

Figure 1:
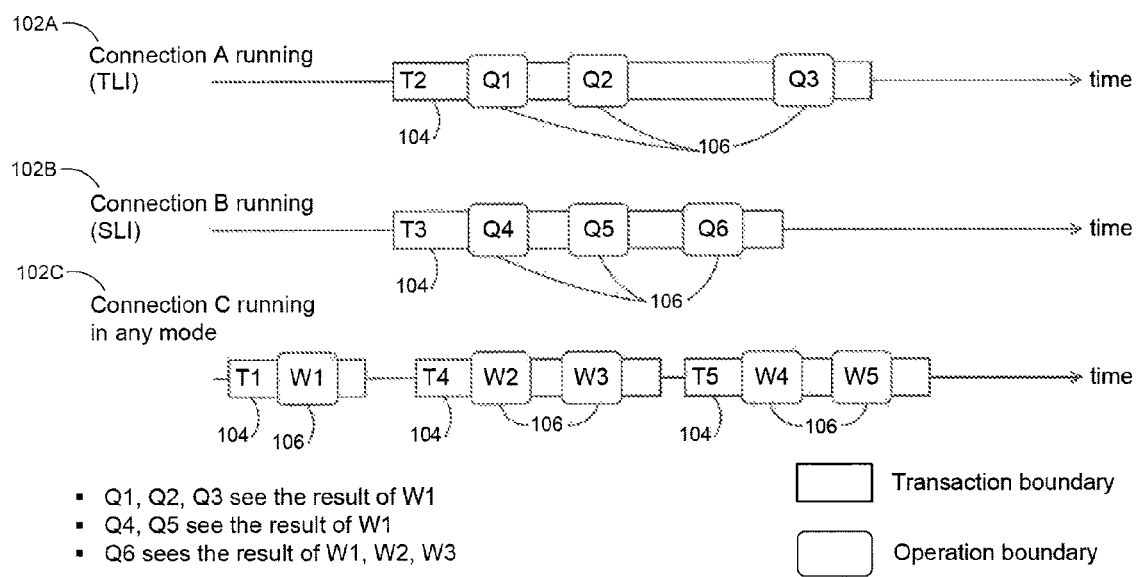
FIG. 1 illustrates exemplary differences between different isolation levels of a database.

Embodiments are described herein with reference to illustrations for particular applications. It should be understood that the embodiments are not intended to be limiting. Those skilled in the art with access to the teachings provided herein will recognize additional modifications, applications, and embodiments within the scope thereof and additional fields in which the embodiments would be of significant utility.

A database often has many transactions simultaneously accessing or seeking to access the data of the database. These transactions include both read and write transactions.

In some database configurations, only a single version of data is maintained. For example, when a write transaction is completed, the previous data, as existing prior to the write transaction, is discarded or otherwise replaced with the new data as it exists after the write transaction. Thus, in essence, maintaining only a single version of the data.

However, there exist other database configurations in which multiple versions of data are maintained. These multi-version databases are commonly referred to as multi-version concurrency control (MVCC) databases. A MVCC database inserts or stores new versions of data in the database and may simultaneously maintain multiple differing versions of data of the database. A MVCC database does not generally overwrite existing versions, unless, for example, an existing version is no longer being used or is out of date. For purposes of this description, it is understood that the term database is referring to a MVCC database. If a single version database is referred to herein, it shall be referred to explicitly as such. Also, data version and database version are used interchangeably.

To keep track of the multiple data versions that may simultaneously exist, databases may use timestamps that are associated with each version. A timestamp could include any indicator that indicates which data values are included in a particular data version. For example, a timestamp may indicate when a data version was created/stored, or which transactions have been committed to the database and should be included in the data version.

A transaction (i.e., database transaction) may include one or more sub-transactions or portions referred to herein as statements or operations. Databases multiple isolation levels to exist. For example, different transactions, or portions thereof (e.g., the various operations or statements of a transaction), may have access to different versions of the data. For example, a particular database configuration may include both transaction level isolation (TLI) and statement level isolation (SLI). In other embodiments, different or additional isolation levels may exist.

A transaction is often made up of a series of statements or operations, though some transactions may include only a single statement or operation. As used herein, the terms statements and operations are used interchangeably to refer to divisible portions of a transaction. In TLI, each operation of a transaction reads an identical snapshot of a data version.

In SLI, by contrast, each operation of a transaction may read a different snapshot of a data version.

For example, a particular transaction may include three operations. In TLI, each operation would see the data as it exists prior to the execution of the first operation of the transaction. In SLI, by contrast, the first operation would see a data version as it existed prior to the execution of the first operation of the transaction. However, the second and third operations may see different snapshots of the data version if a write transaction was committed to the database prior to the execution of the second or third operations, respectively. If however, no write transactions were committed between the second and third operations, all three operations would see the same data in SLI. Similarly, if different write transactions were committed between the second and third operations, all three operations would nonetheless see the same data as it existed prior to the execution of the first operation in TLI.

FIG. 1 illustrates exemplary differences between different isolation levels of a database. More particularly, FIG. 1 illustrates differences between TLI and SLI in greater detail. Connections 102A-C are various connections to a database that may operate in parallel. Connections 102A-C may be connections between the server and an application, computing device, or other system.

Each connection 102A-C includes one or more transactions 104. Each transaction 104 (e.g., T1-T5) includes one or more operations or statements 106. A transaction 104 includes any transaction on a database, including a read or write transaction. Each operation 106 may be a discrete unit of execution that may be performed on a database. In the example of FIG. 1, read operations are designed as Q1-Q6, while write operations are designated as W1-W5. Other embodiments may include different sequences, variations or combinations of write and read operations.

Connection 102A includes an example TLI read transaction T2, in which Q1, Q2 and Q3 each receive the data version as it existed prior to the execution of transaction T2 or operation Q1 of transaction T2. For example, T2 may receive a data version that includes write operation W1 of transaction T1, that was committed to the database prior to the beginning of the execution of T2.

Connection B includes an example SLI read transaction T3, in which each operation Q4, Q5, and Q6 may have access to different data versions. In the example of FIG. 1, Q4 and Q5 may access the same data version, but Q6 may have access to a different data version that includes the result of write operations W2 and W3 of transaction T4 that have been committed to the database prior to the execution of Q6. Meanwhile, Q3 of TLI transaction T2, may have access to an earlier version of data than Q6, as it existed prior to the execution of transaction T2, even though operation Q3 is executed after transaction T4 is committed and after Q6 has executed.

Figure 2:
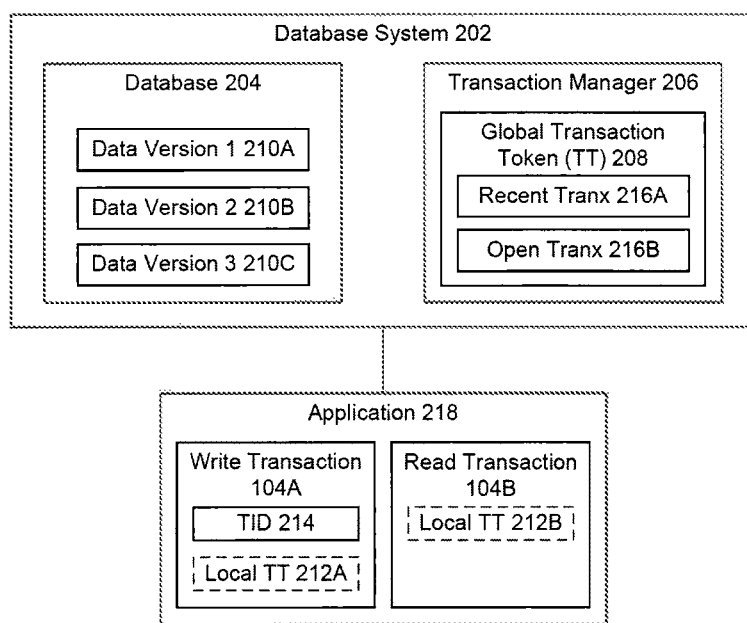
FIG. 2 is a block diagram illustrating an example system 200 implementing a compressed representation of a transaction token.

FIG. 2 is a block diagram illustrating an example system 200 implementing a compressed representation of a transaction token. A database system 202 includes a database 204 and a transaction manager 206. Database system 202 may include multiple servers or computing devices that communicate over a wired and/or wireless network. Database 204 may be any ordered collection of data. The data of database 204 may be organized into tables, columns, and rows. As referenced above database 204 may be a MVCC database.

Transaction manager 206 manages or tracks which transactions 104 are open or closed. Transaction manager 206 further manages which data versions 210A-C currently exist, and determines when a data version 210 is no longer being used and may be discarded, overwritten, or otherwise garbage collected. In an embodiment, old data versions 210 are kept while there is a still an ongoing or open transaction 104 accessing the data version 210. In an embodiment, once there are no more open transactions 104 accessing a particular data version 210, the data version 210 may be garbage collected or replaced with a newer data version 210.

Referring to the example of FIG. 2 for illustrative purposes, transaction manager 206 may maintain a global transaction token 208, herein referred to as simply transaction token or TT 208, to manage data versions 210A-C. TT 208 may be a data structure that indicates which data (e.g., data version 210) is available to transaction 104. For example, TT 208 may indicate which transactions 104 are open and closed.

TT 208 may be requested by or otherwise provided to new transactions 104A, 104B seeking to read from and/or write to database 204. Each such transaction 104 may have one or more local transaction tokens 212A, 212B, depending on whether they are SLI or TLI transactions. For example, an SLI transaction may include or retrieve multiple local copies of the TT 208 for each operation of a transaction 104, if the data changed between operations of the SLI transaction.

Each write transaction 104A may include a unique transaction identifier (TID) 214. Transaction manager 206 may assign each write transaction 104A a unique TID 214. In an embodiment, TIDs 214 may be assigned sequentially to write transactions 104A as they are started or are requested to be started. It may be that write transaction 104A cannot begin until TID 214 has been assigned to write transaction 104A. In the example provided herein, TIDs 214 are consecutive integer numbers, however other embodiments may include other numbering or sequencing formats for assigning TIDs 214.

Transaction manager 206 may maintain one or more levels 216A, 216B or groupings of data for TT 208. The one or more levels 216 of data of the TT 208 may be used to determine the state of transactions 104 of database 204.

TT 208 may include two levels 216A and 216B of data; a recent transactions level 216A (recent tranx 216A) and an open transactions level 216B (open tranx 216B). As will be discussed in greater detail below, recent tranx 216A may include a grouping of recent transactions 104 to database 204 and their corresponding statuses (e.g., open or closed). Other embodiments may include different or varying statuses. Open tranx 216B may include a listing of older transactions 104 (e.g., that are not included in recent tranx 216A) to database 204, each of which includes a similar status (e.g., all of which have an "open" status).

Transactions 104A, 104B may include requests from an application 218. Application 218 may be a computer program, system, process or other computing device seeking to access database 202. Application 218 may request to perform, or request to have performed, write transaction 104A or read transaction 104B. Transaction manager 206 may provide local TTs 212A, 212B responsive to the requested transactions 104A, 104B. As discussed above, a particular transaction 104A, 104B may receive multiple local TTs 212A, 212B depending on whether it is an SLI or TLI transaction.

Figure 3A:
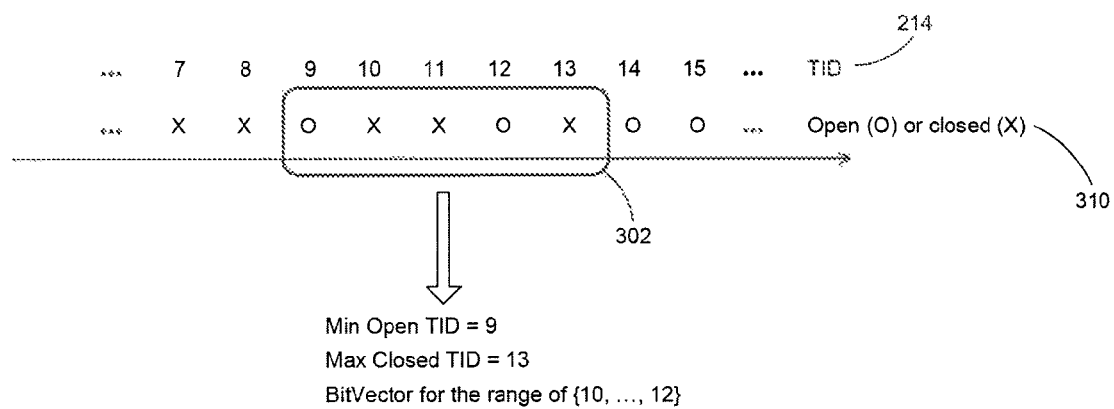
FIGS. 3A-3C illustrate example transaction tokens.
Figure 3B:
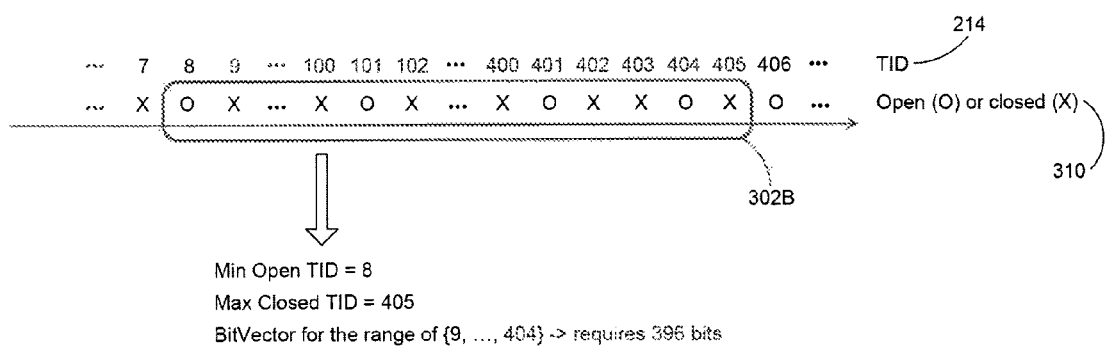
Figure 3C:
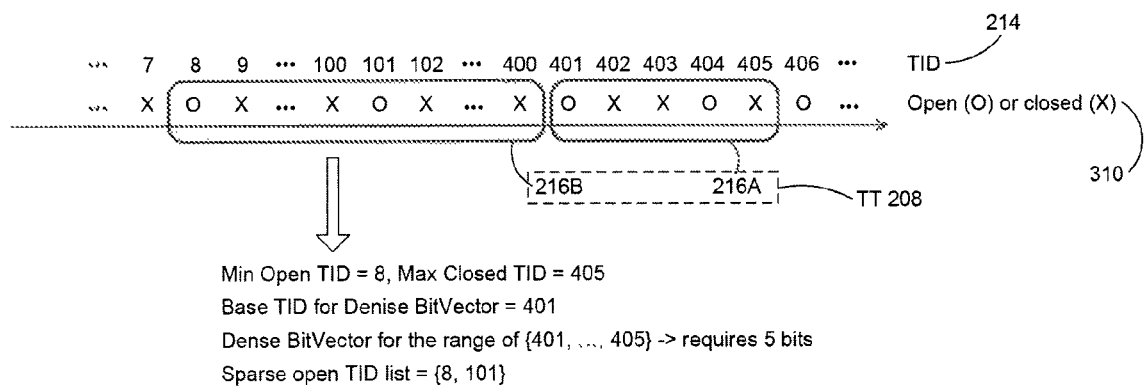

FIGS. 3A-3C illustrate example transaction tokens. FIG. 3A illustrates an example transaction token as used by conventional database systems. In the example shown, the top row of data shows transaction IDs (TIDs 214) for various transactions (e.g., 104) to a database system. The bottom row shows the corresponding status or transaction states 310 of each of TIDs 214. "O" indicates that the transaction is open, while "X" indicates that the transaction has been closed or committed to the database. In an embodiment, statuses 310 may include other statuses as well, such an aborted status.

From transaction states 310, transaction manager 206 identifies the minimum open TID (the transaction with the lowest TID 214 that remains open 310), which is TID 9. Transaction manager 206 also identifies the maximum closed TID (the transaction with the highest TID 214 that has been completed or closed 310), which is TID 13. The highlighted portion of the sequence indicates that portion of data to be captured in a conventional transaction token 302.

Given the identification of the minimum open TID and maximum closed TID, a conventional database system maintains a conventional transaction token 302 in the form of a BitVector that identifies the states (310) of the transactions. The BitVector structure provides a compacted vector of Booleans, with one bit for each Boolean value. As such, each transaction between 10 (one above the minimum open TID) and 12 (one below the maximum closed TID) may be included in a BitVector of a conventional transaction token 302. The corresponding Boolean may indicate whether the transaction is open or closed. In an embodiment, 0 may indicate the transaction to be open (false), and 1 may indicate a transaction to be closed (true).

In an embodiment, a transaction token, such as TT 208, may include various fields of information. For example, a transaction token may include a maxCID field that indicates the commit ID of the most recently committed transaction. The CID (commit ID) may identify a commit sequence of when various TIDs 214 were committed to the database. A transaction token may also include the field nextWriteTID that indicates the TID 214 that will be assigned to the next write transaction. A transaction token may also include an identification of closed TIDs, and a read/write flag that indicates whether the transaction is a read or write transaction.

For the transactions of FIG. 3A, a conventional transaction token 302 would include a BitVector for TIDs 10-12. From the conventional transaction token 302, the status 310 of each transaction could then be determined, as it would be known that TID 13 is closed, and all TIDs above 13 are open, while TID 9 is open, and all smaller TIDs have been closed, and the remaining TIDs 214 are then explicitly provided by the BitVector of the conventional transaction token 302.

FIG. 3B illustrates a problem with the conventional transaction token 302. For example, database systems may have some long running transactions, or transactions that execute or otherwise stay open over a long period of time. When this occurs, when transactions run over long periods of time, a conventional transaction token 302B used by conventional database systems must continue to track all the transactions (e.g., TIDs 214) between the smallest open and largest closed transactions. This may cause the conventional transaction token 302B to become large, the memory required to maintain such conventional transaction token 302B to increase, and may also cause an increase in the processing resources and/or processing time required to transmit and process conventional transaction token 302B.

As the size of the conventional transaction token 302B grows, the speed of processing of the database system often slows, as each transaction (e.g., 104A, B) needs to receive at least one local copy (e.g., local TT 212A, 212B) of a conventional transaction token 302B. A very large transaction token (i.e., conventional transaction token 302B) will take longer to transmit, process, and read than a smaller transaction token (e.g., conventional transaction token 302 of FIG. 3A).

In the example of FIG. 3B, transactions 8 and 101 may be long running or executing transactions. The conventional transaction token 302B would include a BitVector data structure that includes status 310 for the range of TIDs 214 from 9 to 404, and indicates status 310 for all the information for TIDs 8 to 405, which requires 396 bits. Such a size for a conventional transaction token 302B would significantly slow conventional database processing.

FIG. 3C illustrates a solution according to an embodiment to solve the problem described with regard to conventional transaction token 302B. FIG. 3C illustrates the same TIDs 214 described in FIG. 3B, with identical statuses 310. Rather than storing statuses 310 of TIDs 214 in a single BitVector data structure however, TT 208, as used by the database system of FIG. 2, stores the data in multiple levels or groupings 216A and 216B.

For example, transaction manager 206 may manage two levels 216A and 216B of data for TT 208. A first level 216A would be for recent transactions (e.g., dense or recent tranx 216A from FIG. 2), while a second level 216B would be for older transactions (e.g., sparse or open tranx 216B from FIG. 2). First level 216A would be similar to the conventional transaction token 302 or BitVector data structure as describe above. However, first level data 216A or the BitVector data structure of TT 208 may have a threshold that designates a maximum size, number of transactions, or timestamp that first level 216A would track as being a "recent" transaction 104. For example, the threshold may be set to ten. Then, for example, if the size of BitVector TT 208 grows beyond the threshold number (e.g., ten) transactions, the any older transactions (e.g., transactions with smaller TIDs) may be tracked by the second level of data 216B. In the example shown, the threshold or size of first level 216A (dense BitVector) is set to five. It is noted that embodiments of the invention are not limited to the example threshold sizes provided herein.

Second level 216B may include a list of open transactions (i.e., TIDs 214 for transactions beyond the threshold whose status 310 is set to or remains as open). For example, second level 216B may include the TIDs 8 and 101 (shown as the sparse open TID list), which are beyond the threshold but remain open. In an embodiment, second level 216B may be stored as a list, array or other data structure.

From the combination of first level 216A and second level 216B as provided in TT 208, status 310 of each transaction (i.e., TID 214) may be determined. Further, TT 208 of FIG. 3C overcomes the shortcomings of the conventional transaction tokens 302 and 302B as described in FIGS. 3A and 3B. TT 208 accounts for long running transactions in second level of data 216B. Using multiple data levels 216 enables TT 208 to use significantly fewer bits than required by conventional transaction token 302B as shown in FIG. 3B.

The use of TT 208 reduces the processing and transmission time required in a database system, and improves the speed of processing. Often, database systems will only have a relatively small number of long running transactions (such as TIDs 8 and 101) that would be stored in second level of data 216B. Other embodiments may include additional levels 216 of data in various other structures. For example, multiple BitVector levels (e.g., 216A) may be provided in a TT 208 in another embodiment. Or, for example, instead of indicating which transactions are open, the second or additional level 216B of data may indicate which transactions are closed.

Returning to the description of FIG. 2, transaction manager 206 may store a global version of TT 208. Then, when a transaction 104A or 104B starts, the transaction 104 may receive a local copy 212 of the global TT 208 as it exists. In a SLI system or transaction 104, prior to the beginning of each operation of the transaction 104, a new local TT 212 may be retrieved or provided to the transaction (e.g., the machine upon which transaction 104 is executing), the updated local TT 212 including the transactions 104 that were closed since the beginning of the previous operation. The new local TT 212 may either overwrite the existing local TT 212, be stored in conjunction with the old local TT 212, or the old local TT 212 may be discarded when a new local TT 212 is retrieved or received.

When transaction 104, such as write transaction 104A closes, a message may be transmit or sent to transaction manager 206 which updates TT 208. In another embodiment, write transaction 104A itself may update TT 208 after the completion of transaction 104A. Prior to the beginning of the next transaction 104, a local TT 212 (i.e., copy of the updated global TT 208) may be received by the transaction 104.

Figure 4:
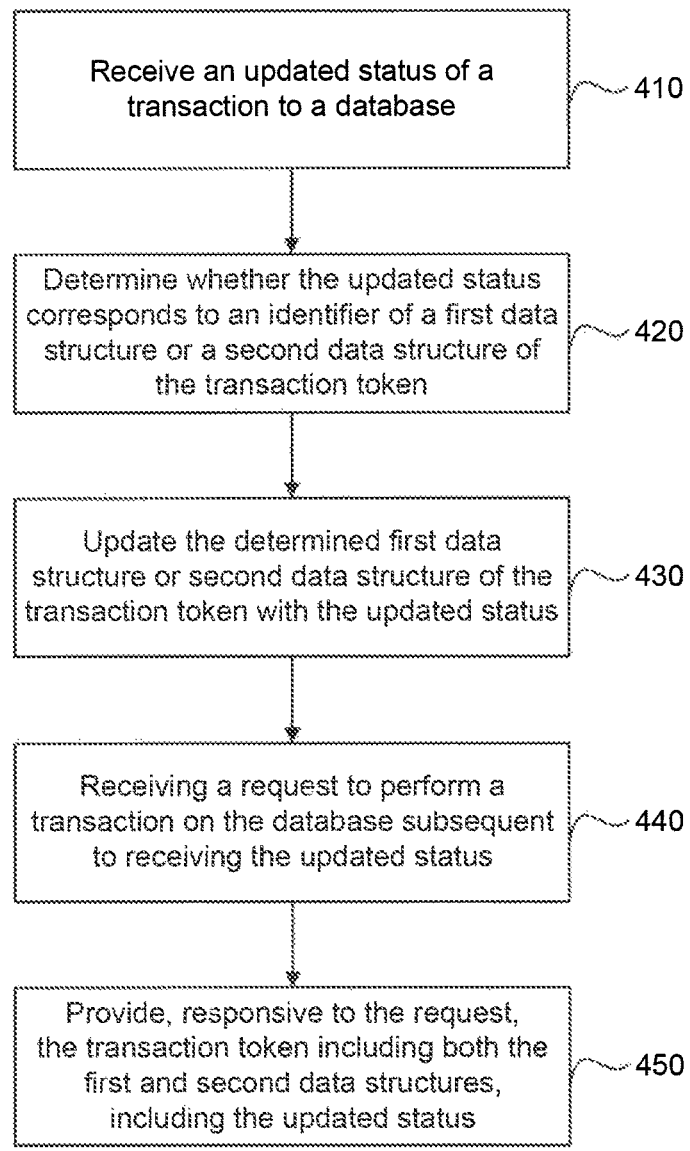
FIG. 4 is a method for using a compressed representation of a transaction token, according to an embodiment.

FIG. 4 is a method for using a compressed representation of a transaction token, according to an embodiment.

At stage 410, an updated status of a transaction to a database is received. For example, transaction manager 206 may receive an updated status of transaction 104A. In an embodiment, the update may indicate that transaction 104 has completed.

At stage 420, it is determined whether the updated status corresponds to an identifier of a first data structure or a second data structure of the transaction token. For example, transaction manager 208 may determine whether TID 214 corresponding to transaction 104A is included in recent tranx 216A or open tranx 216B.

At stage 430, the determined first data structure or second data structure of the transaction token is updated with the updated status. For example, transaction manager 206 updates either recent tranx 216A or open tranx 216B with the updated status of TID 214. This update will cause an update to global TT 208 and may create a new corresponding data version 210C to be accessible in database 204.

At stage 440, a request to perform a transaction on the database is received subsequent to receiving the updated status. For example, transaction manager 206 may subsequently receive a request to perform transaction 104A or 104B on database 204.

At stage 450, the transaction token including both the first and second data structures, including the updated status, is provided responsive to the request. For example, transaction manager 216 may provide the updated global TT 208, including the updated recent tranx 216A or open tranx 216B. Application 218 may include a local copy of the global TT 212, which may allow application to access corresponding data version 210C.

Figure 5:
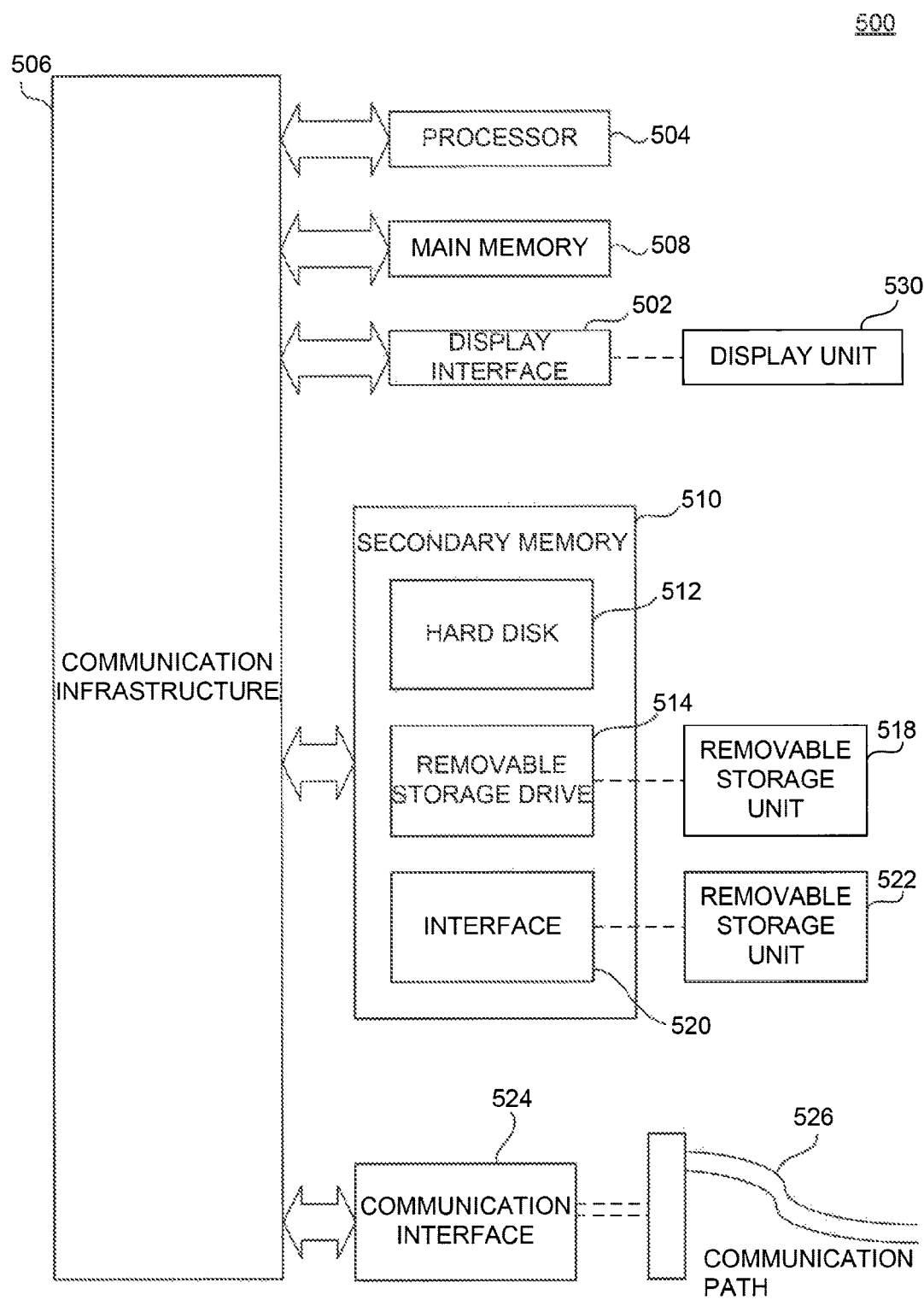
FIG. 5 illustrates an example computer system in which embodiments as described herein, or portions thereof, may be implemented.

FIG. 5 illustrates an example computer system 500 in which embodiments as described herein, or portions thereof, may be implemented as computer-readable code. For example, the database system 202, TT 208, and methods related thereto, may be implemented in computer system 500 using hardware, software, firmware, tangible computer readable media having instructions stored thereon, or a combination thereof, and may be implemented in one or more computer systems or other processing systems.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement the embodiments using other computer systems and/or computer architectures. Although some operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 504 may be a single processor in a multi-core/multiprocessor system, such system may be, operating alone, or in a cluster of computing devices operating in a cluster or server farm. Processor device 504 is connected to a communication infrastructure 506, for example, a bus, message, queue, network, or multi-core message-passing scheme.

Computer system 500 also includes a main memory 508, for example, random access memory (RAM), and may also include a secondary memory 510. Main memory 508 may include any kind of tangible memory. Secondary memory 510 may include, for example, a hard disk drive 512, and a removable storage drive 514. Removable storage drive 514 may include a floppy disk drive, a magnetic tape drive, an optical disk drive, a flash memory, or the like. The removable storage drive 514 reads from and/or writes to a removable storage unit 518 in a well-known manner. Removable storage unit 518 may include a floppy disk, magnetic tape, optical disk, etc. which is read by and written to by removable storage drive 514. As will be appreciated by persons skilled in the relevant art, removable storage unit 518 includes a computer readable storage medium having stored therein computer software and/or data.

Computer system 500 (optionally) includes a display interface 502 (which can include input and output devices such as keyboards (e.g., 104), mice, etc.) that forwards graphics, text, and other data from communication infrastructure 506 (or from a frame buffer not shown) for display on display unit 530.

In alternative implementations, secondary memory 510 may include other similar I/O ways for allowing computer programs or other instructions to be loaded into computer system 500, such as a removable storage unit 522 and an interface 520. Examples may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of storage-incapable signals, which may be electronic, electromagnetic, optical, or other signals capable of being, received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 518, removable storage unit 522, and a hard disk installed in hard disk drive 512. Computer storage medium and computer readable storage medium may also refer to memories, such as main memory 508 and secondary memory 510, which may be memory semiconductors (e.g. DRAMs, etc.). Such mediums include non-transitory storage mediums.

Computer programs (also called computer control logic) are stored in main memory 508 and/or secondary memory 510. Computer programs may also be received via communications interface 524. Such computer programs, when executed, enable computer system 500 to implement embodiments as discussed herein. Where the embodiments are implemented using software, the software may be stored in a computer program product and loaded into computer system 500 using removable storage drive 514, interface 520, and hard disk drive 512, or communications interface 524.

Embodiments also may be directed to computer program products comprising software stored on any computer readable medium. Such software, when executed in one or more data processing device, causes a data processing device(s) to operate as described herein. Embodiments may employ any computer readable storage medium. Examples of computer readable storage mediums include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nanotechnological storage device, etc.).

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are, possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The Summary and Abstract sections may set forth one or more but not all exemplary embodiments contemplated, and thus, are not intended to limit the described embodiments or the appended claims in any way.

Various embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept as described herein. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method, comprising:
   determining a transaction token that maintains statuses of transactions to a database in both a first data structure and a second data structure, wherein the first data structure and second data structure are organized differently and include different transaction identifiers corresponding to the transactions;
   receiving an update to a status of a transaction to the database corresponding to a particular transaction identifier;
   determining that the first data structure includes a plurality of transaction identifiers respectively corresponding to transactions of the database and stores a corresponding status of each transaction identifier indicating whether a given transaction is open or closed, wherein the plurality of transaction identifiers are maintained below a threshold number of identifiers, wherein the threshold number of identifiers indicates a number of recent transactions to the database;
   determining that a plurality of transaction identifiers correspond to open transactions to the database beyond the threshold number of identifiers that were initiated before processing of the recent transactions based on their inclusion in the second data structure that only includes open transactions;
   determining that the particular transaction identifier corresponding to the updated status does not exist in the first data structure or the second data structure of the transaction token;
   adding the particular transaction identifier to the first data structure;
   if the threshold number of identifiers of the first data structure, including the particular transaction identifier, is exceeded, moving one or more open transactions from the first data structure to the second data structure, such that the transactions of the first data structure is below the threshold number of identifiers;

receiving a request to perform a transaction on the database subsequent to receiving the updated status; and providing, responsive to the request, an updated transaction token to the database including both the first data structure and the second data structure.

2. The method of claim 1, wherein the database is a multi-version concurrency control (MVCC) database configured to maintain a plurality of data versions.

3. The method of claim 1, wherein the first data structure is a BitVector data structure, and wherein the second data structure is one of a list or an array.

4. The method of claim 1, wherein the first data structure includes an indication of a highest numbered identifier that has a closed status and a lowest numbered identifier that has an open status, and wherein any numbered identifiers beyond the threshold number of identifiers that have an open status are stored in the second data structure.

5. The method of claim 4, wherein the threshold number of identifiers indicates a maximum number of identifiers stored in the first data structure, and wherein each of the transactions is either a write transaction or a read transaction.

6. The method of claim 4, wherein one or more identifiers greater than the highest numbered identifier that has a closed status have open statuses, and one or more identifiers lower than the lowest numbered identifier have closed statuses.

7. The method of claim 1, wherein the providing comprises:

providing a local copy of the transaction token for use with performing the requested transaction.

8. The method of claim 1, wherein the threshold number of identifiers indicates a timestamp indicator of which transactions are stored in the first data structure or the second data structure.

9. The method of claim 1, wherein the receiving an updated status comprises:

receiving a request to access data of the database;

determining, based on the transaction token, which transactions are open and closed in the database; and providing a local transaction token responsive to receiving the request, wherein the local transaction token is a copy of the transaction token, wherein if the request is a write request, assigning the write request a new transaction identifier.

10. The method of claim 1, wherein the updating comprises:

updating the first data structure with a new entry corresponding to the updated status;

determining that the first data structure has exceeded the threshold number of identifiers;

moving a smallest transaction identifier with an open status from the first data structure to the second data structure, wherein a smaller transaction identifier corresponds to an earlier date of a transaction relative to a larger transaction identifier, and wherein the smallest transaction identifier with the open status when stored in the second data structure is not stored with its status information.

11. The method of claim 1 wherein the transaction identifiers are assigned by a transaction manager that maintains the first data structure and the second data structure of the transaction token.

12. The method of claim 1 further comprising:

determining that a particular transaction identifier corresponds to a closed transaction based on the particular transaction identifier not existing in either the first data structure or the second data structure.

13. The method of claim 1, wherein the plurality of transaction identifiers of the second data structure correspond to open transactions moved from the first data structure, wherein the second data structure does not include closed transactions.

14. The method of claim 1, wherein the moving comprises:

removing status information from the one or more open transactions moved from the first data structure to the second data structure, wherein an open status for the moved transactions may be determined based upon their storage in the second data structure.

15. The method of claim 1, further comprising:

changing the status of the particular transaction identifier in the first data structure from open to closed.

16. The method of claim 1, further comprising:

receiving an update to a status of a second transaction corresponding to a second transaction identifier;

determining that the second transaction identifier is in the second data structure; and removing the second transaction identifier from the second data structure.

17. A system, comprising:

a database operating on one or more processors, the database including multiple versions of data;

a global transaction token indicating which version of the data is accessed by a transaction, the global transaction token including both a first data structure and a second data structure, wherein the first data structure and second data structure are organized differently and include different transaction identifiers corresponding to the transactions;

and a transaction manager configured to:

receive an update to a status of a transaction to the database corresponding to a particular transaction identifier, determine that the first data structure includes a plurality of transaction identifiers respectively corresponding to transactions of the database and stores a corresponding status of each transaction identifier indicating whether a given transaction is open or closed, wherein the plurality of transaction identifiers are maintained below a threshold number of identifiers, wherein the threshold number of identifiers indicates a number of recent transactions to the database, determine that a plurality of transaction identifiers correspond to open transactions to the database beyond the threshold number of identifiers that were initiated before processing of the recent transactions based on their inclusion in the second data structure that only includes open transactions, determine that the particular transaction identifier corresponding to the updated status does not exist in the first data structure or the second data structure of the transaction token, add the particular transaction identifier to the first data structure, if the threshold number of identifiers of the first data structure, including the particular transaction identifier, is exceeded, move one or more open transactions from the first data structure to the second data structure, such that the transactions of the first data structure is below the threshold number of identifiers, provide local copies of the global transaction token responsive to one or more requests to perform transactions on the database.

18. The system of claim 17, wherein the transaction manger is configured to assign a new identifier to a request to perform a write transaction, and wherein the threshold number of identifiers indicates a maximum number of identifiers stored in the first data structure.

19. The system of claim 18, wherein the first data structure includes an indication of a highest numbered identifier that has a closed status and a lowest numbered identifier that has an open status, and
wherein any numbered identifiers beyond the threshold number of identifiers that have an open status are stored in the second data structure.

20. The system of claim 17, wherein the first data structure is a BitVector data structure.

21. The system of claim 20, wherein the second data structure is one of a list or an array.

22. A computer program product comprising a non-transitory memory accessible to one or more processors, the memory comprising code that when executed cause the one or more processors to:
determine a transaction token that maintains statuses of transactions to a database in both a first data structure and a second data structure does not include the updated status, wherein the first data structure and second data structure are organized differently and include different transaction identifiers corresponding to the transactions;
receive an update to a status of a transaction to the database corresponding to a particular transaction identifier;
determine that the first data structure includes a plurality of transaction identifiers respectively corresponding to transactions of the database and stores a corresponding status of each transaction identifier indicating whether a given transaction is open or closed, wherein the plurality of transaction identifiers are maintained below a threshold number of identifiers, wherein the threshold number of identifiers indicates a number of recent transactions to the database;
determine that a plurality of transaction identifiers correspond to open transactions to the database beyond the threshold number of identifiers that were initiated before processing of the recent transactions based on their inclusion in the second data structure that only includes open transactions;
determine that the particular transaction identifier corresponding to the updated status does not exist in the first data structure or the second data structure of the transaction token;
add the particular transaction identifier to the first data structure;
if the threshold number of identifiers of the first data structure, including the particular transaction identifier, is exceeded, move one or more open transactions from the first data structure to the second data structure, such that the transactions of the first data structure is below the threshold number of identifiers;
receive a request to perform a transaction on the database subsequent to receiving the updated status; and
provide, responsive to the request, an updated transaction token to the database including both the first data structure and the second data structure.

23. The computer program product of claim 22, wherein the first data structure is a BitVector data structure, and the second data structure is one of a list or an array.

24. The computer program product of claim 22, wherein the memory comprises code that when executed cause the one or more processors to:
determine that an updated identifier corresponding to the updated status does not exist in the first data structure or second data structure;
add the updated identifier to the first data structure; and
if the threshold number of identifiers of the first data structure, including the updated identifier, is exceeded, move one or more open transactions from the first data structure to the second data structure, such that the transactions of the first data structure is below the threshold number of identifiers.

* * * * *